United States Patent
Van Den Bergh

(10) Patent No.: US 8,406,985 B2
(45) Date of Patent: Mar. 26, 2013

(54) METHOD FOR STARTING AN INTERNAL COMBUSTION ENGINE

(75) Inventor: Ruben Van Den Bergh, Rutesheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 476 days.

(21) Appl. No.: 12/701,723

(22) Filed: Feb. 8, 2010

(65) Prior Publication Data

US 2010/0242889 A1   Sep. 30, 2010

(30) Foreign Application Priority Data

Mar. 31, 2009 (DE) .......................... 10 2009 015 092
Jul. 29, 2009 (DE) .......................... 10 2009 035 160

(51) Int. Cl.
  *F02N 11/08* (2006.01)
  *F01L 1/34* (2006.01)
(52) U.S. Cl. .................... 701/112; 123/90.15; 123/179.4
(58) Field of Classification Search ............... 123/90.15, 123/90.16, 179.4, 179.16, 179.18, 198 DB; 701/112
   See application file for complete search history.

(56) References Cited

U.S. PATENT DOCUMENTS

| | | | | |
|---|---|---|---|---|
| 6,390,041 B2* | 5/2002 | Nakamura et al. | ......... | 123/90.15 |
| 7,040,304 B2* | 5/2006 | Kassner | ......... | 123/565 |
| 7,059,297 B2* | 6/2006 | Kataoka et al. | ......... | 123/322 |
| 7,134,412 B2 | 11/2006 | Beer et al. | | |
| 7,146,966 B2* | 12/2006 | Nakamura | ......... | 123/481 |
| 7,191,746 B2* | 3/2007 | Nakamura | ......... | 123/179.3 |
| 7,207,306 B2* | 4/2007 | Kondo | ......... | 123/179.4 |
| 7,212,910 B2* | 5/2007 | Akasaka | ......... | 701/112 |
| 7,255,081 B2* | 8/2007 | Sieber et al. | ......... | 123/179.17 |
| 7,383,119 B2* | 6/2008 | Lewis | ......... | 701/112 |
| 7,406,937 B2* | 8/2008 | Kulzer et al. | ......... | 123/179.3 |
| 7,438,042 B1* | 10/2008 | Kawada | ......... | 123/198 B |
| 7,458,353 B2* | 12/2008 | Takahashi | ......... | 123/179.4 |
| 7,472,016 B2* | 12/2008 | Takeyama et al. | ......... | 701/113 |
| 7,559,304 B2* | 7/2009 | Kataoka et al. | ......... | 123/179.4 |
| 7,571,709 B2* | 8/2009 | Lewis et al. | ......... | 123/320 |
| 7,813,864 B2* | 10/2010 | Kawai et al. | ......... | 701/103 |
| 8,095,298 B2* | 1/2012 | Nakamura et al. | ......... | 701/112 |
| 8,136,497 B2* | 3/2012 | Gibson et al. | ......... | 123/179.4 |
| 8,141,358 B2* | 3/2012 | Kolmanovsky et al. | ......... | 60/605.1 |
| 8,141,533 B2* | 3/2012 | Demura | ......... | 123/179.4 |
| 8,180,552 B2* | 5/2012 | Nomura et al. | ......... | 701/103 |
| 2001/0003973 A1* | 6/2001 | Nakamura et al. | ......... | 123/90.16 |
| 2003/0106515 A1* | 6/2003 | Kondo | ......... | 123/179.4 |

(Continued)

FOREIGN PATENT DOCUMENTS

DE      10123037 A1   11/2002
DE  102007009857 A1    9/2008

(Continued)

*Primary Examiner* — Thomas Moulis
(74) *Attorney, Agent, or Firm* — Leydig, Voit & Mayer, Ltd.

(57) ABSTRACT

A method automatically starts an internal combustion engine having variable valve lift. The internal combustion engine is shut down temporarily in certain driving operating states in order to save fuel and being re-started in the event of a change in the driving operating state. During the engine run-down, the inlet valve is actuated such that the closing time is shifted, with the cylinder being opened via the inlet valve until a pressure compensation has taken place in the cylinder in which an under-pressure would prevail during the engine run-down.

4 Claims, 2 Drawing Sheets

U.S. PATENT DOCUMENTS

| | | | |
|---|---|---|---|
| 2005/0139183 A1* | 6/2005 | Nohara et al. | 123/179.18 |
| 2005/0205049 A1* | 9/2005 | Lewis | 123/198 DB |
| 2005/0211194 A1* | 9/2005 | Hanson et al. | 123/21 |
| 2006/0102125 A1* | 5/2006 | Mashiki | 123/179.4 |
| 2006/0157014 A1* | 7/2006 | Kondo | 123/179.4 |
| 2007/0163531 A1* | 7/2007 | Lewis et al. | 123/179.4 |
| 2007/0181088 A1* | 8/2007 | Akasaka | 123/179.4 |
| 2009/0287399 A1* | 11/2009 | Picron et al. | 701/112 |
| 2010/0114461 A1* | 5/2010 | Gibson | 701/112 |
| 2010/0313837 A1* | 12/2010 | Fujioka | 123/90.17 |
| 2011/0120405 A1* | 5/2011 | Notani | 123/179.3 |

FOREIGN PATENT DOCUMENTS

| | | |
|---|---|---|
| EP | 1712765 A1 | 10/2006 |
| JP | 2007154669 A | 6/2007 |
| JP | 2007270792 A | 10/2007 |

* cited by examiner

METHOD FOR STARTING AN INTERNAL COMBUSTION ENGINE

CROSS-REFERENCE TO RELATED APPLICATION

This application claims the priority, under 35 U.S.C. §119, of German applications DE 10 2009 015 092.7, filed Mar. 31, 2009, and DE 10 2009 035 160.4, filed Jul. 29, 2009; the prior applications are herewith incorporated by reference in their entirety.

BACKGROUND OF THE INVENTION

Field of the Invention

The invention relates to a method for restarting an internal combustion engine in a motor vehicle, wherein the engine is shut down temporarily in certain driving operating states in order to save fuel and should be automatically re-started when driving operation is resumed, without the vehicle driver actuating the starting of the engine.

European patent EP 1 712 765 B1, corresponding to U.S. Pat. No. 7,134,412, discloses a method which, when the motor vehicle is at a standstill, initiates a stopping process of the internal combustion engine, with a re-start taking place when the motor vehicle is to continue driving. The known method discloses a start optimization which enables the internal combustion engine to be started even before a synchronization with the crankshaft has taken place.

So-called blow-by gas is encountered in internal combustion engines. This is understood to mean the gas which squeezes past the piston rings in an internal combustion engine. The blow-by gas can be sucked from the combustion chamber into the crankcase during the compression or sucked from the crankcase into the cylinder when an engine is shut down. In any case, a pressure compensation takes place on account of the cylinder internal pressure and the ambient pressure.

In the event of frequent stopping and restarting of the engine, during a starting process after a previous stop, the internal combustion engine is hot and spontaneous explosive combustion reactions can occur on account of the blow-by gas sucked into the cylinder, which combustion reactions are heard by the driver as knocking.

SUMMARY OF THE INVENTION

It is accordingly an object of the invention to provide a method for starting an internal combustion engine which overcomes the above-mentioned disadvantages of the prior art methods of this general type, which configures the starting process to be comfortable and prevents knocking during starting.

With the foregoing and other objects in view there is provided, in accordance with the invention a method for starting an internal combustion engine having a variable valve lift. The internal combustion engine is shut down temporarily in certain driving operating states for saving fuel and being re-started in an event of a change in a driving operating state. During engine run-down, an inlet valve is actuated such that a closing time is shifted such that a cylinder which would have an under-pressure during the engine run-down has an open inlet valve when the engine is at a standstill.

By the method according to the invention, the inlet valve and/or the throttle flap are not immediately closed fully when the engine is shut down, as a result of which pressure compensation can take place and no undesired blow-by gas is sucked in from the cylinder. As a result, undesired combustions and the associated undesired acoustic levels are prevented.

It is thus advantageous, in the case of engines with variable valve lift adjustment, to shut down the engine in the large lift setting, since the inlet valve is then open at the corresponding cylinder on account of the later closing time, and pressure compensation takes place without blow-by gas.

Furthermore, the throttle flap may be closed during the shut-down process, with the comfort during the shut-down process simultaneously being increased.

Other features which are considered as characteristic for the invention are set forth in the appended claims.

Although the invention is illustrated and described herein as embodied in a method for starting an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
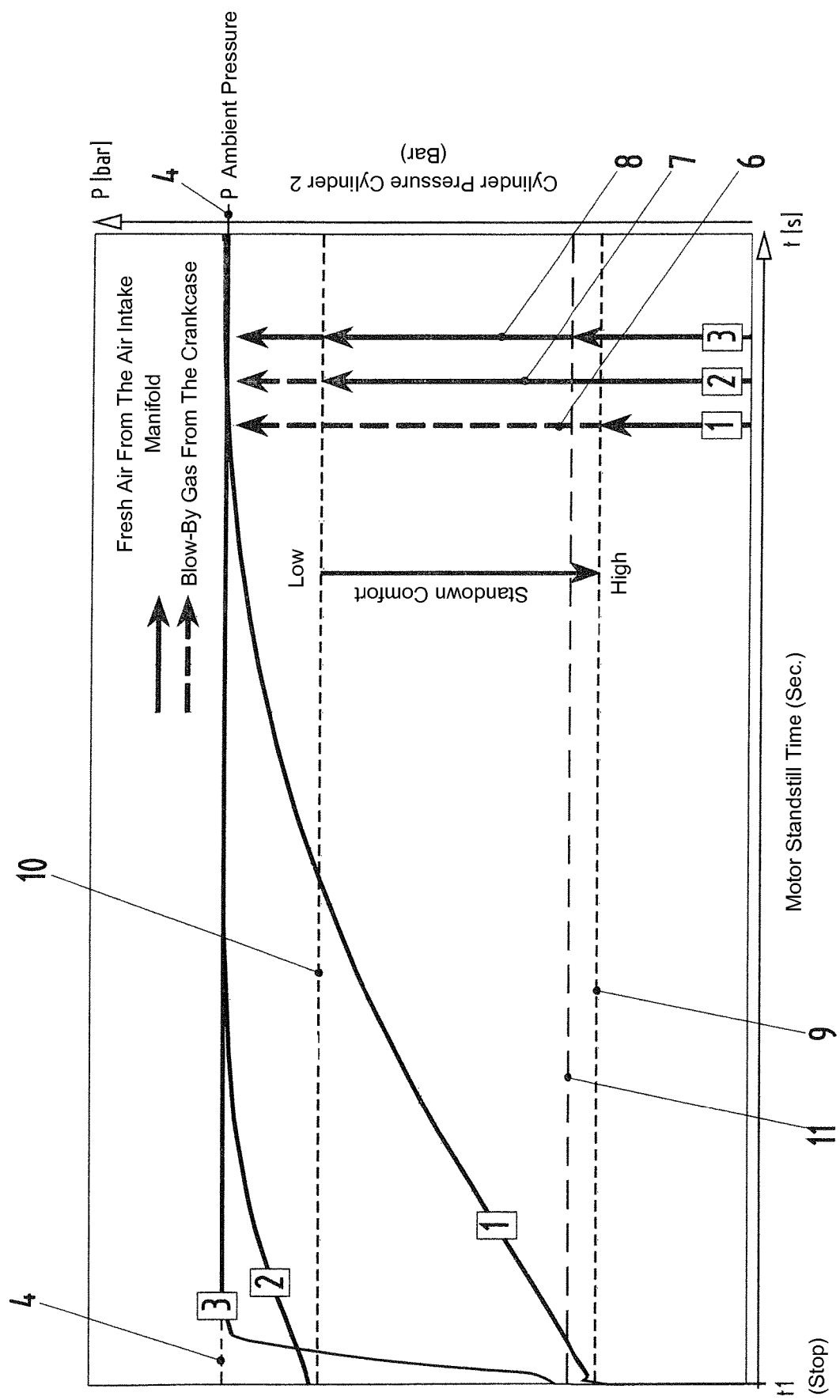
FIG. 1 is a graph showing the relationship between time and pressure, the diagram illustrating different pressure profiles according to the invention.

The diagram in FIG. 1 extends over time and cylinder pressure, with one cylinder being illustrated here by way of example.

In FIG. 1, the time t in seconds s is plotted on the abscissa, with time t1 denoting the start of the engine standstill time after a stop demand "Stop". The cylinder internal pressure p of a cylinder in bar is plotted on the ordinate, which in FIG. 1 is illustrated at the right-hand side of the time axis t. The ambient pressure P is shown on the ordinate. The diagram itself illustrates three different pressure profiles as they would occur in the cylinder depending on the activation of the valves and/or throttle flap.

The curve 1 illustrates the pressure profile in a cylinder after the engine is stopped if the inlet valve has a small valve lift, or is closed, and the throttle flap position is closed during the shut-down process. The curve 2 shows the cylinder internal pressure when the inlet valve is closed and when the throttle flap is not fully closed. Here, an opening angle of for example 10° is conceivable. The curve 3 shows the pressure profile after the stop process with a large inlet valve lift or an open inlet valve, and a closed throttle flap. On the axis which shows pressure, the ambient pressure p is illustrated by line 4.

In the presence of stop demands Stop at the time t1, the ignition and the injection are interrupted in order to implement the stop demand. To directly implement a stopping process of the internal combustion engine, it is advantageous for the ignition and the injection to be interrupted without a delay. This means ideally that the inlet valves are closed, the throttle flap is closed and the ignition is deactivated.

Figure 2:
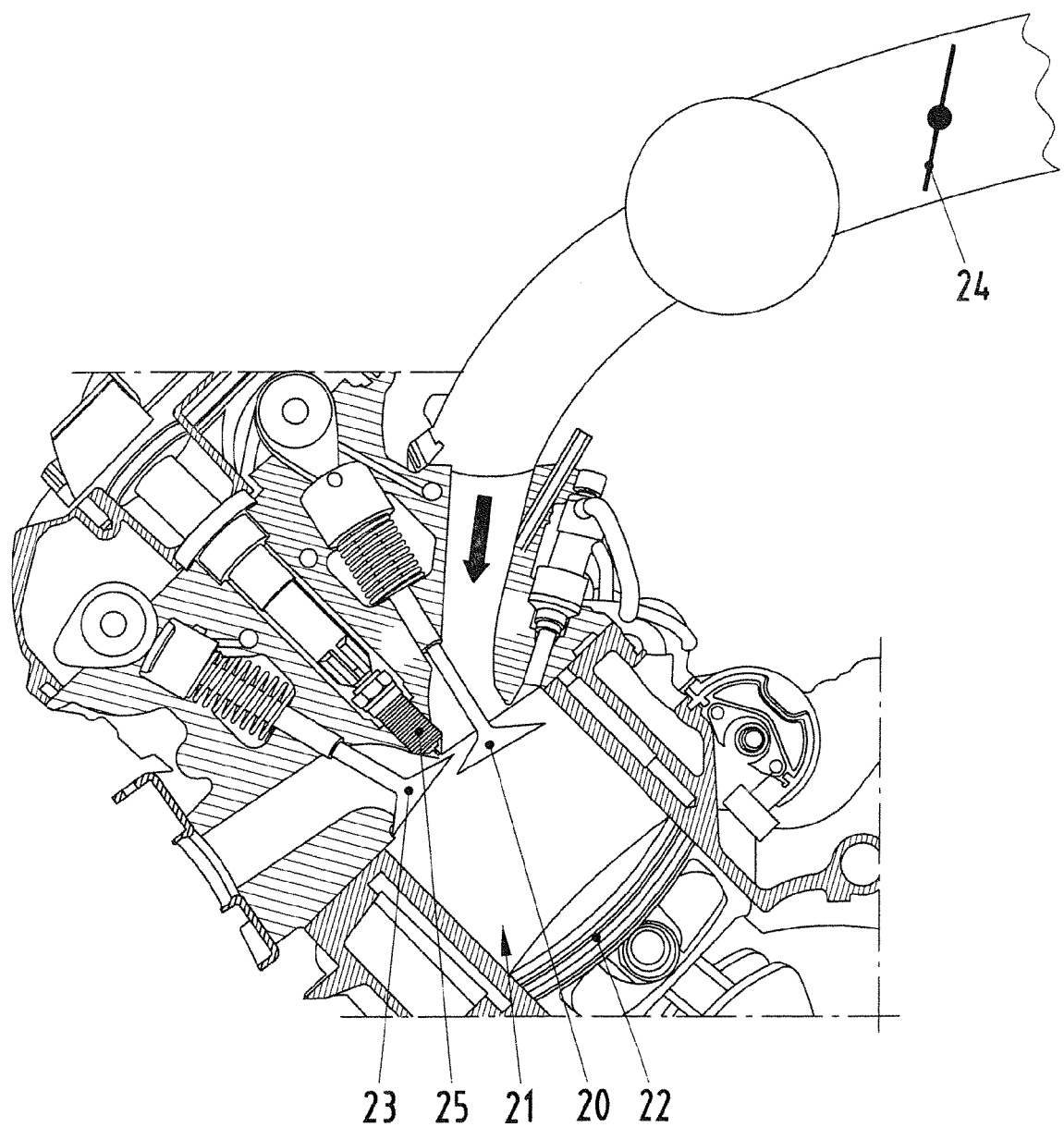
FIG. 2 is a diagrammatic, sectional view of a cylinder of an engine.

FIG. 2 schematically shows the combustion chamber of a cylinder 21, piston 22, inlet valve 20 and outlet valve 23, a throttle flap 24 and a spark plug 25. The inlet valve 20 is illustrated in FIG. 2 with a large inlet valve lift. If the engine is shut down in the small valve lift setting, the inlet valve is closed in a plurality of cylinders when the engine is at a standstill, and the cylinder pressure compensation takes place via the piston rings. This means that hot gas is sucked from the crankcase into the cylinders if an under-pressure prevails in the cylinder.

The pressure profiles 1, 2 and 3 of FIG. 1 are explained below. For the pressure profiles, the composition of the gas which has passed into the combustion chamber is indicated on the right-hand side of the diagram. Here, curve 6 shows the composition of the pressure profile 1, the composition with reference numeral 7 corresponds to the pressure profile 2 and composition 8 corresponds to the pressure profile 3. For a clear illustration, the reference numeral of the corresponding pressure profile is shown together with the indications of the compositions. All the curves 6, 7 and 8 have in common that the component of fresh air from the intake pipe is illustrated as a solid line and the component of the blow-by gas from the crankcase is illustrated as a dashed line.

The curve 1 shows the pressure profile in a cylinder when the engine is at a standstill and the inlet valve is closed. The throttle flap has been closed during the engine stop process, and since the inlet valve is closed, pressure compensation takes place only by blow-by gas being sucked from the crankcase via the piston rings. In contrast, if the inlet valve is open, as is the case if the inlet valve is operating with a large valve lift, then air from the intake pipe can affect the pressure compensation in the cylinder, as illustrated by the curve 3.

A further option is shown by the pressure profile 2 with the associated composition of the gas component 7. Here, the inlet valve is closed (small valve lift) and the throttle flap is open, such that fresh air passes into the cylinder via the path during the stop process of the engine. The component of blow-by gas is considerably smaller. The absolute pressure in the cylinder is considerably higher and consequently, less blow-by gas is sucked in for pressure compensation.

In FIG. 1, the dashed lines 9 and 10 illustrate the measure of the shut-down comfort after a stop demand. Here, it can be clearly seen that the shut-down comfort is very high with a small inlet valve lift at the time of the stop demand, whereas the shut-down comfort is low with a pressure profile according to the line 2, which illustrates the pressure profile with a small valve lift and with the throttle flap open.

In the case of line 3, the advantages of shut-down comfort and low blow-by gas component are combined.

Since the pressure compensation when the engine is at a standstill takes place via the open inlet valve, the throttle flap can be substantially closed during the run-down of the engine, and therefore the shut-down comfort can be increased, see the dashed line 11.

With the possibility of sucking fresh air from the intake section into the cylinder, it is ensured that no spontaneous combustion reactions are triggered during a restart of the internal combustion engine. Driving comfort and the generation of noise are thereby considerably increased.

The invention claimed is:

1. A method for operating an internal combustion engine having a variable valve lift, the method comprising;
    temporarily shutting down the internal combustion engine in certain driving operating states for saving fuel and re-starting the internal combustion engine in an event of a change in a driving operating state;
    during, engine run-down, actuating an inlet valve such that a closing time is shifted such that a cylinder which would have an under-pressure during the engine run-down has an open inlet valve when the engine is at a standstill; and
    closing a throttle flap in an event of a stop demand.

2. The method according to claim 1, which further comprises, upon detection of the stop demand, performing pressure compensation via the open inlet valve of the cylinder.

3. The method according to claim 1, which further comprises in the event of the stop demand, closing the inlet valve after a pressure compensation of a cylinder internal pressure.

4. The method according to claim 3, which further comprises for a late closing time, switching the inlet valve to a large valve lift.

* * * * *